(12) United States Patent
Plyler

(10) Patent No.: US 6,755,599 B1
(45) Date of Patent: Jun. 29, 2004

(54) RECESSED WHEEL CHOCK

(76) Inventor: Randall L. Plyler, 1956 Church Rd., Hummelstown, PA (US) 17036

( * ) Notice: Subject to any disclaimer, the term of this patent is extended or adjusted under 35 U.S.C. 154(b) by 0 days.

(21) Appl. No.: 10/424,737

(22) Filed: Apr. 29, 2003

(51) Int. Cl.[7] .............................. B60P 3/06; B60P 3/075; B60T 3/00
(52) U.S. Cl. ............................................ 410/30; 211/21
(58) Field of Search .............................. 410/3, 4, 7, 8, 410/9, 19, 30; 188/32; 211/20, 21

(56) References Cited

U.S. PATENT DOCUMENTS

| | | | | |
|---|---|---|---|---|
| 703,280 A | | 6/1902 | Knoche | |
| 2,585,370 A | * | 2/1952 | Cless | ............................ 188/32 |
| 2,661,817 A | * | 12/1953 | Mullins | ......................... 188/32 |
| 2,666,502 A | * | 1/1954 | Fee | ................................ 188/32 |
| 2,816,627 A | * | 12/1957 | Wilson et al. | ................. 188/32 |
| 2,829,738 A | | 4/1958 | Vasquez | |
| 2,858,905 A | | 11/1958 | Fahland | |
| 3,295,255 A | * | 1/1967 | Russo | ............................ 49/49 |
| 3,387,686 A | * | 6/1968 | Little | ............................ 188/32 |
| 4,109,763 A | * | 8/1978 | Sugino | ........................... 188/32 |
| 4,140,206 A | * | 2/1979 | Yamazaki et al. | ............. 188/32 |
| 4,421,210 A | * | 12/1983 | Sugino | .......................... 188/32 |
| 5,444,949 A | * | 8/1995 | Ciaccio | ......................... 52/155 |
| 6,095,731 A | * | 8/2000 | Minakami et al. | ............. 410/20 |
| 6,345,693 B1 | * | 2/2002 | Yeo et al. | ..................... 187/211 |
| 6,478,525 B2 | * | 11/2002 | Hageman et al. | ............ 414/401 |

FOREIGN PATENT DOCUMENTS

DE            3528039       *   2/1987   .................. 188/32

* cited by examiner

Primary Examiner—D. Glenn Dayoan
Assistant Examiner—H. Gutman
(74) Attorney, Agent, or Firm—Donald C. Casey

(57) ABSTRACT

A collapsible, recessed wheel chock is described. The chock is intended to be mounted in the bed of a truck or trailer and can be collapsed into a flush mount with the bed when not in use. The chock when in use is rotated from the closed position into an open position which is at an obtuse angle to the bed, and is supported in that position by right and left supports so that a wheel of a motorcycle or the like can be received against the open chock and retained between the lateral supports against movement The supports also function to prevent damage to the chock in the event the retained vehicle wheel. attempts to move forward.

7 Claims, 3 Drawing Sheets

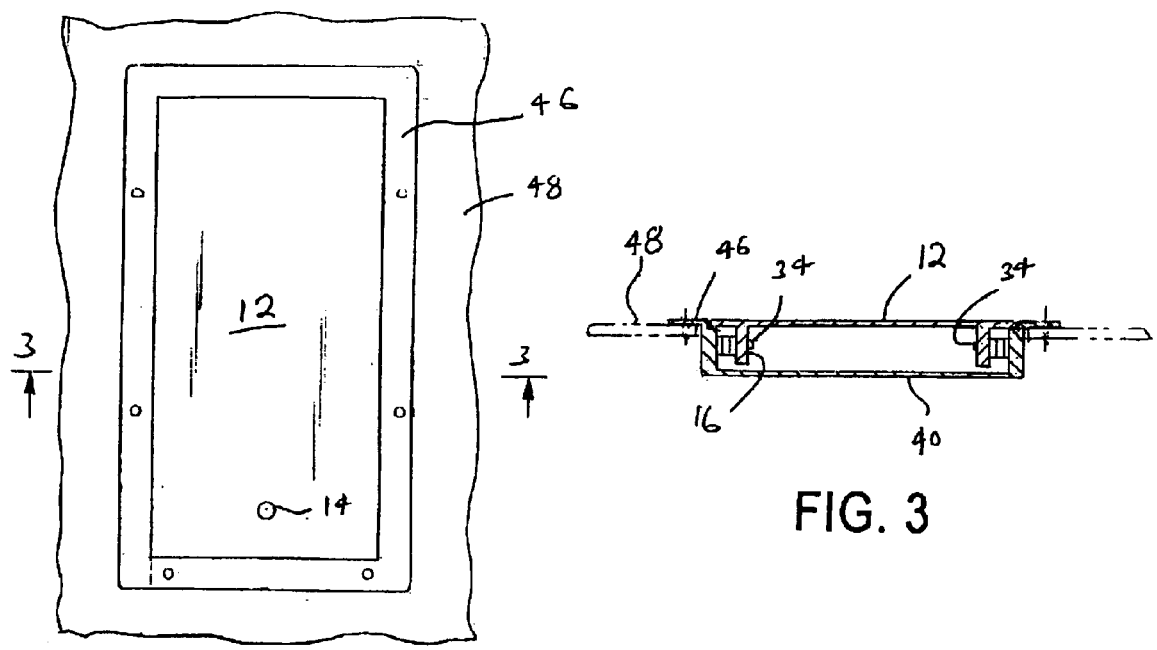
FIG. 2
FIG. 3
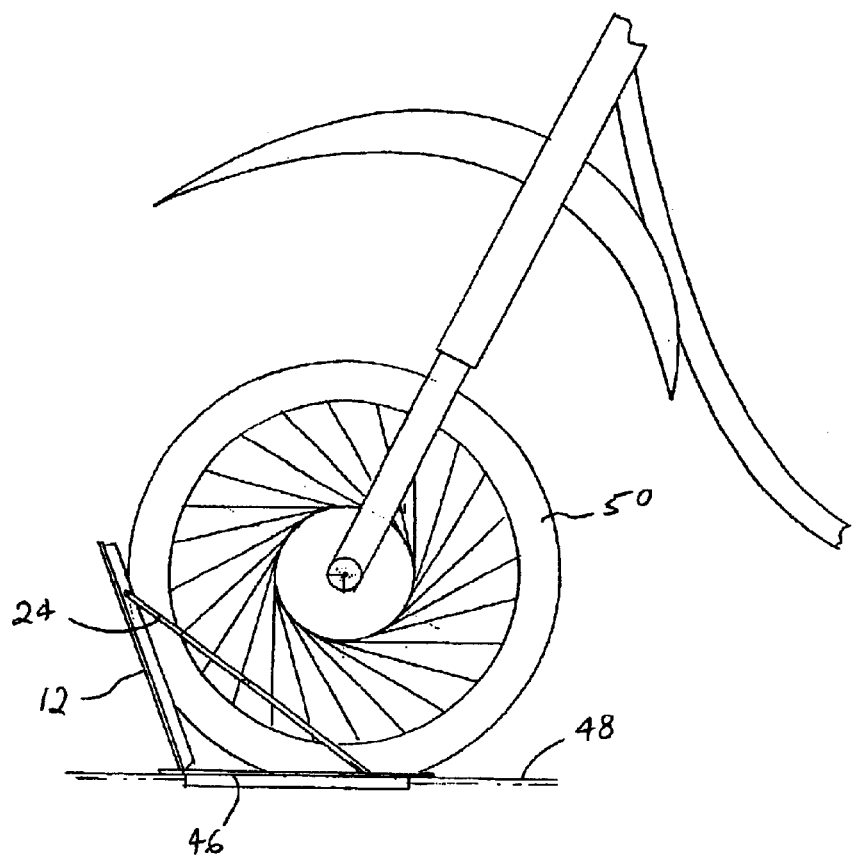
FIG. 4

RECESSED WHEEL CHOCK

FIELD OF THE INVENTION

This invention relates to a wheel chock for transporting a motorcycle, all terrain vehicle (ATV), or similar vehicles in a truck or trailer.

DESCRIPTION OF THE PRIOR ART

When transporting a motorcycle or other sport vehicle typically the vehicle will be tied down either in a pulled trailer, or in the bed of a pickup truck. The vehicle will be transported to where it is to be ridden, and then off loaded. It is necessary then to stabilize such a vehicle during transport and chocks have been used for this purpose for many years. A chock typically will be used to engage the front wheel of front wheels in the case of an ATV and typically the chock is bolted to the bed of the truck or trailer. In this case cargo capacity will be severally limited when the vehicle is not being transported by the presence of the chock on the truck or trailer bed surface.

In U.S. Pat. No. 2,858,905 there is a described an adjustable wheel block which is normally recessed in the floor of a freight car. The block can be raised to engage the wheels of a heavy truck or similar vehicle being transported in the freight car. Spindles are provided on either end of the block which engage a recessed track against movement of the wheels.

Collapsible chocks are also known, and such a chock is described in U.S. Pat. No. 2,829,738. This is a chock for airplane wheels and it is intended that the chock will be collapsed and stored within the airplane when not in use. The chock is raised to an upright position by a linkage and collapsed by pivoting this linkage out of the way.

Another type of collapsible chock is described in U.S. Pat. No. 703,280 which is a sidewalk mounted chock for a bicycle. When not in use the chock collapses into a recess in the sidewalk, and when it is in use it is manually raised and engages the front wheel. When the chock is in a raised position a stop at the base engages an end of the recess against further movement.

These collapsible chocks then are not intended to stabilize a motorcycle or similar vehicle as it is being transported with the incumbent vibration and bumps inherent in such travel.

Accordingly, there is a need for a recessed chock which can be mounted in the bed of a truck or trailer and which may be collapsed when not in use so that the vehicle can be used for unrestricted hauling of cargo.

SUMMARY OF THE INVENTION

The collapsible chock of this invention is normally stowed in a recess in the bed of a trailer or truck and is essentially flush mounted when closed. The chock, which is essentially a plate, is hingeably mounted at the forward end to the recess frame and a hole is provided in the opposite end for gripping to raise the chock. When the rear end of the plate is raised it pivots about the hinge mounting.

Parallel side support members are provided which are engaged at the upper end of the plate and the rear end of the recess frame and they are intended to both stop movement of the plate in the open position, and engage the tires of the vehicle mounted in the chock. The side support members then function to stabilize the vehicle laterally, and in the forward direction so that, for example, if the vehicle brakes sharply the motorcycle will not damage the chock as it is urged forward by inertia.

Accordingly it is an object of this invention to provide a recessed chock which is stabilized against movement of a vehicle engaged in the chock and which may be collapsed into a flush mounting with the floor of the trailer or truck bed when not in use.

It is another object of this invention to provide a collapsible chock which is structurally able to stabilize a motorcycle, ATV or similar vehicle as it is being transported in the bed of a truck or in a trailer.

It is another object of this invention to provide a collapsible chock which can be flush mounted with the bed of a trailer or truck as part of the floor thereof when not in use and easily raised by hand when a vehicle is being transported so that the front wheel engages the chock.

These and other objects will become readily apparent with reference to the drawings and following description wherein:

BRIEF DESCRIPTION OF THE DRAWINGS

FIG. 2 is a plane view of the chock of this invention in the lowered or stored position.

FIG. 3 is a cross-sectional view taken along lines 3—3 of FIG. 2.

FIG. 4 is a fragmentary view illustrating a vehicle engaged by the chock of this invention.

DETAILED DESCRIPTION OF THE INVENTION

Figure 1:
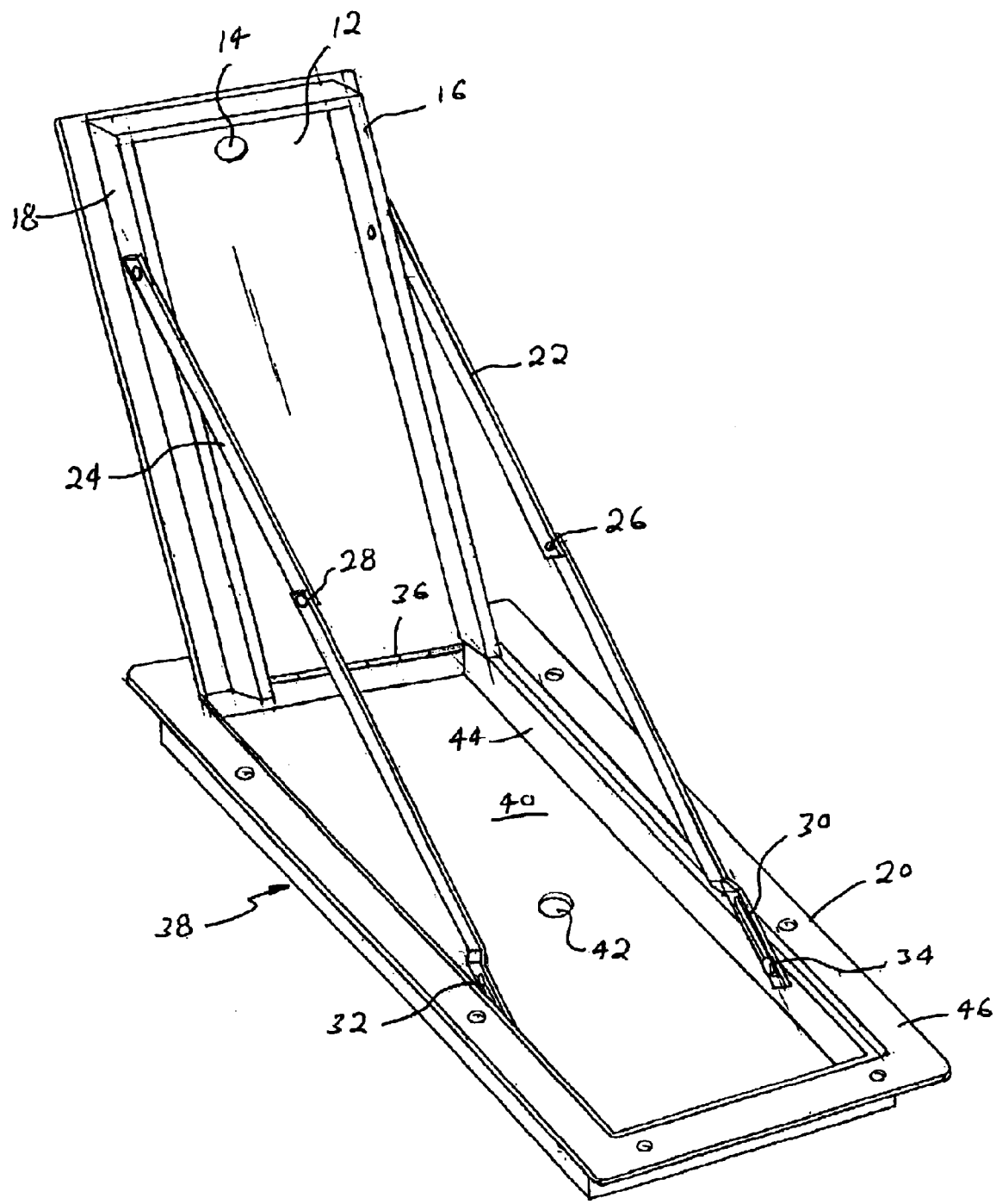
FIG. 1 is a perspective view of the chock of this invention in a raised position.

With attention to the drawings and to FIG. 1 in particular, the collapsible chock of this invention 10 consists of an upper plate 12 having a hand grip 14 and opposed side members 16 and 18. A rectangular frame housing 20 is mounted as will be subsequently explained flush or essentially flush with the bed of a trailer or truck.

Side support members 22 and 24 are pictured in FIG. 1 as hinged at 26 and 28 with slots 30 and 32 equipped to slide in pins 34 when the chock is collapsed. See FIG. 3. Plate 12 is hingedly attached by hinge 36 to the mount housing 38. Housing 38 has a floor 40 with preferably a drain hole 42 and sides 44 with a depth compatible with depending side members 16, 18 from plate 12. A lip 46 is provided for mounting on the bed of the trailer.

With attention to FIGS. 2 and 3, the lip 46 is preferably mounted on the surface 48 of a truck bed or trailer bed. Any conventional mounting may be used such as bolts or the like.

When the chock of this invention is collapsed as shown in FIGS. 2 and 3, the side 16 of plate 12 rests on the floor 40 of housing 38.

As shown in FIG. 4, the depth of floor 40 below lip 46 is sufficient to allow the wheel of a motorcycle 50 to rest in the recess and against the plate 12. In this way a sudden braking of the vehicle will not damage the hinge connection between plate 12 and side 44 because of the stabilizing supports 22 and 24.

Figure 5:
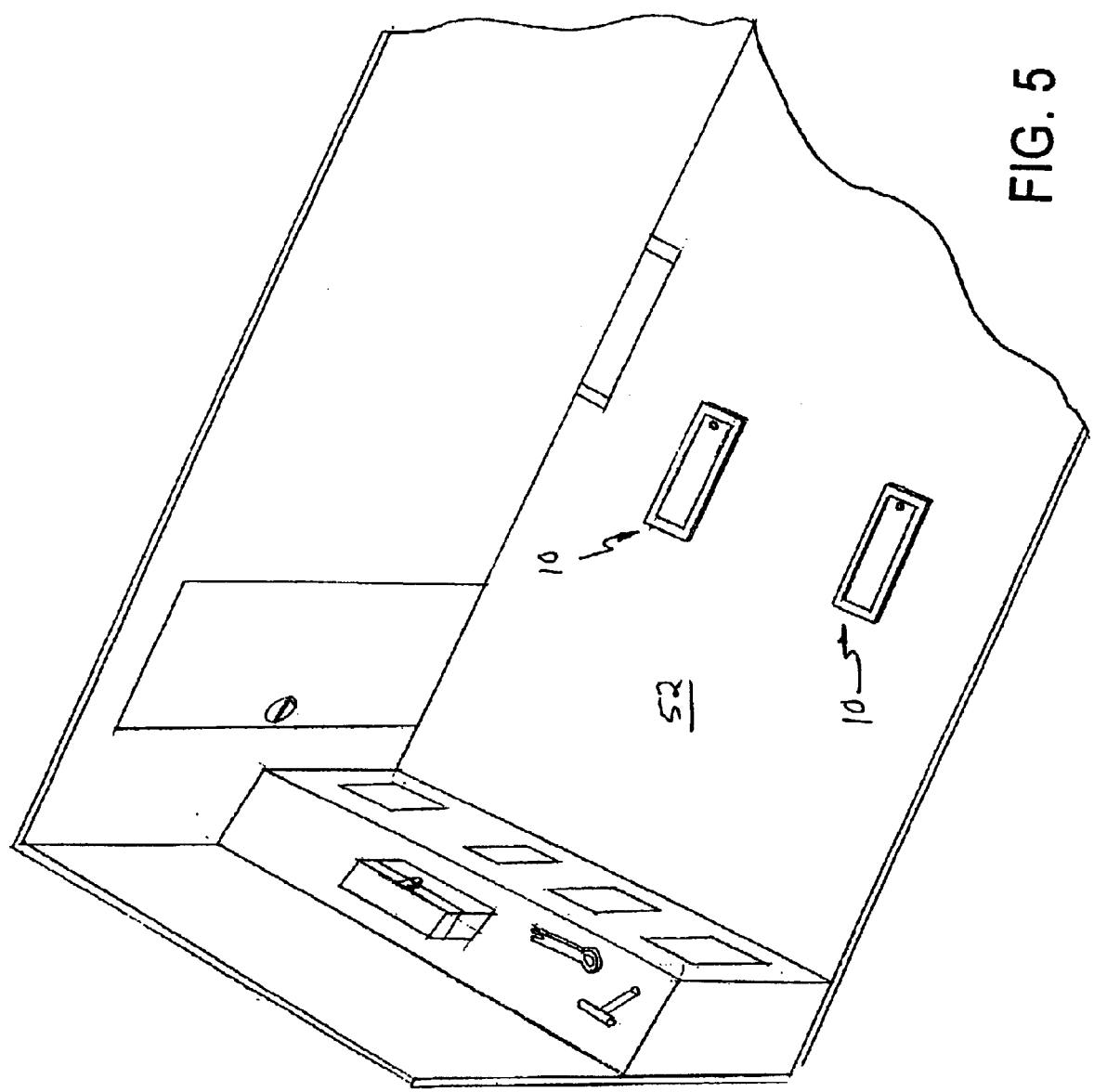
FIG. 5 is a fragmentary perspective view illustrating a pair of the chocks of this invention in a closed position.

As shown in FIG. 5, a plurality of the chocks 10 of this invention can be provided in the floor 52 as shown. A pair of motorcycles then can be transported, or in the case of an ATV both front wheels can be engaged.

It will be obvious to those skilled in the art that this invention is not intended to be limited to the type of side supports shown. For example, instead of the rigid members 22 and 24 which are hinged, and could, for example, be replaced with cable connections which would not be rigid.

This invention also is not intended to be limited to the type of vehicle being transported and could be dimensioned to different sizes of motorcycles, bicycles, or other sport vehicles.

It will be readily seen by one of ordinary skill in the art that the present invention fulfills all of the objects set forth above. After reading the foregoing specification, one of ordinary skill will be able to effect carious changes, substitutions or equivalents and various other aspects of the invention as broadly disclosed herein. It is therefore intended that the protection granted hereon be limited only by the definition contained in the appended claims and equivalents thereof.

What is claimed:

1. A collapsible wheel chock adapted to be mounted on the bed of a truck or trailer comprising:

a rectangular housing having a floor, upstanding sides and a mounting flange extending outwardly from the end of said sides opposite said floor, said flange forming a 90° angle with said sides;

a rectangular plate having opposed sides, a front end, and a rear end, said plate hingedly mounted at the front end to said housing at the juncture of a side and adjacent flange;

said plate movable between a closed position parallel to said floor and a open position at an obtuse angle to said floor;

lateral stabilizer means mounted between the rear end of said plate and an adjacent side of said housing floor for stopping rotation of said plate about its hinge mounting when said plate is in the open position and for collapsing into said housing when said plate is in the closed position.

2. The chock of claim 1 wherein the stabilizer means includes bar members slidably connected to said housing at one end and pivotably connected to each said side of said plate at an opposite end.

3. The chock of claim 2 wherein right and left bars are provided, each having a centrally located hinge.

4. The chock of claim 1 further comprising right and left side members mounted on the opposed sides of said plate and adapted to be received in said housing when said plate is in the closed position.

5. The chock of claim 4 wherein said plate side members are dimensioned to rest on said floor when said plate is in the closed position wherein said plate is located in the plane containing said mounting flange.

6. The chock of claim 1 wherein a drain hole is provided in said floor of said housing.

7. The chock of claim 1 wherein a finger pull is provided in said plate for moving said plate from a closed to an open position manually.

* * * * *